United States Patent
Wagh et al.

(10) Patent No.: US 9,489,322 B2
(45) Date of Patent: Nov. 8, 2016

(54) REDUCING LATENCY OF UNIFIED MEMORY TRANSACTIONS

(71) Applicant: Intel Corporation, Santa Clara, CA (US)

(72) Inventors: Mahesh Wagh, Portland, OR (US); Prashanth Kalluraya, Foster City, CA (US)

(73) Assignee: Intel Corporation, Santa Clara, CA (US)

(*) Notice: Subject to any disclaimer, the term of this patent is extended or adjusted under 35 U.S.C. 154(b) by 145 days.

(21) Appl. No.: 14/317,308

(22) Filed: Jun. 27, 2014

(65) Prior Publication Data

US 2015/0067433 A1    Mar. 5, 2015

Related U.S. Application Data

(60) Provisional application No. 61/873,060, filed on Sep. 3, 2013.

(51) Int. Cl.
| | | |
|---|---|---|
| H03M 13/00 | (2006.01) | |
| G06F 13/16 | (2006.01) | |
| G06F 13/42 | (2006.01) | |
| H04L 1/18 | (2006.01) | |

(52) U.S. Cl.
CPC ....... G06F 13/1631 (2013.01); G06F 13/4234 (2013.01); H04L 1/1867 (2013.01)

(58) Field of Classification Search
CPC combination set(s) only.
See application file for complete search history.

(56) References Cited

U.S. PATENT DOCUMENTS

| | | | | |
|---|---|---|---|---|
| 5,440,752 A | | 8/1995 | Lentz et al. | |
| 5,535,345 A | * | 7/1996 | Fisch | G06F 15/17 710/108 |
| 5,574,880 A | * | 11/1996 | Shaw | G06F 9/3816 365/230.03 |
| 5,644,784 A | * | 7/1997 | Peek | G06F 13/28 710/24 |
| 5,717,946 A | * | 2/1998 | Satou | G06F 9/30018 710/35 |
| 5,781,774 A | | 7/1998 | Krick | |
| 6,073,180 A | * | 6/2000 | Onoda | H04L 67/06 709/230 |
| 6,628,615 B1 | | 9/2003 | Joseph et al. | |
| 6,898,699 B2 | * | 5/2005 | Jourdan | G06F 9/3802 712/238 |
| 6,978,351 B2 | * | 12/2005 | Osborne | G06F 13/4243 711/137 |
| 6,999,091 B2 | * | 2/2006 | Saxena | G09G 5/39 345/540 |
| 7,225,300 B1 | | 5/2007 | Choquette et al. | |
| 7,340,495 B2 | * | 3/2008 | Buxton | G06F 9/3001 708/209 |
| 2003/0177313 A1 | | 9/2003 | Iyer et al. | |
| 2005/0138276 A1 | * | 6/2005 | Navada | G06F 13/1647 711/105 |
| 2005/0172091 A1 | | 8/2005 | Rotithor et al. | |
| 2007/0204076 A1 | * | 8/2007 | Arulambalam | G06F 13/28 710/35 |
| 2011/0087859 A1 | * | 4/2011 | Mimar | G06F 9/30043 712/4 |
| 2012/0112889 A1 | * | 5/2012 | Mo | H04B 5/0062 340/10.1 |
| 2013/0070779 A1 | | 3/2013 | Spink et al. | |
| 2014/0304573 A1 | * | 10/2014 | Dodson | G06F 11/0751 714/807 |

* cited by examiner

*Primary Examiner* — Guerrier Merant
(74) *Attorney, Agent, or Firm* — Trop, Pruner & Hu, P.C.

(57) ABSTRACT

In an embodiment, an apparatus includes a consuming logic to request and process data including a critical data portion and a second data portion, the data stored in a memory coupled to a processor interposed between the apparatus and the memory. In addition, the apparatus includes a protocol stack logic coupled to the consuming logic to issue a read request to the memory via the processor to request the data and to receive a plurality of completions responsive to the read request. In an embodiment, the protocol stack logic includes a completion handling logic to send data of a first of the completions to the consuming logic before protocol stack processing is completed on the completions. Other embodiments are described and claimed.

20 Claims, 11 Drawing Sheets

REDUCING LATENCY OF UNIFIED MEMORY TRANSACTIONS

This application claims priority to U.S. Provisional Patent Application Ser. No. 61/873,060, filed Sep. 3, 2013, the content of which is hereby incorporated by reference.

TECHNICAL FIELD

This disclosure pertains to computing systems, and in particular to reduced latency communications within a system.

DETAILED DESCRIPTION

Figure 1:
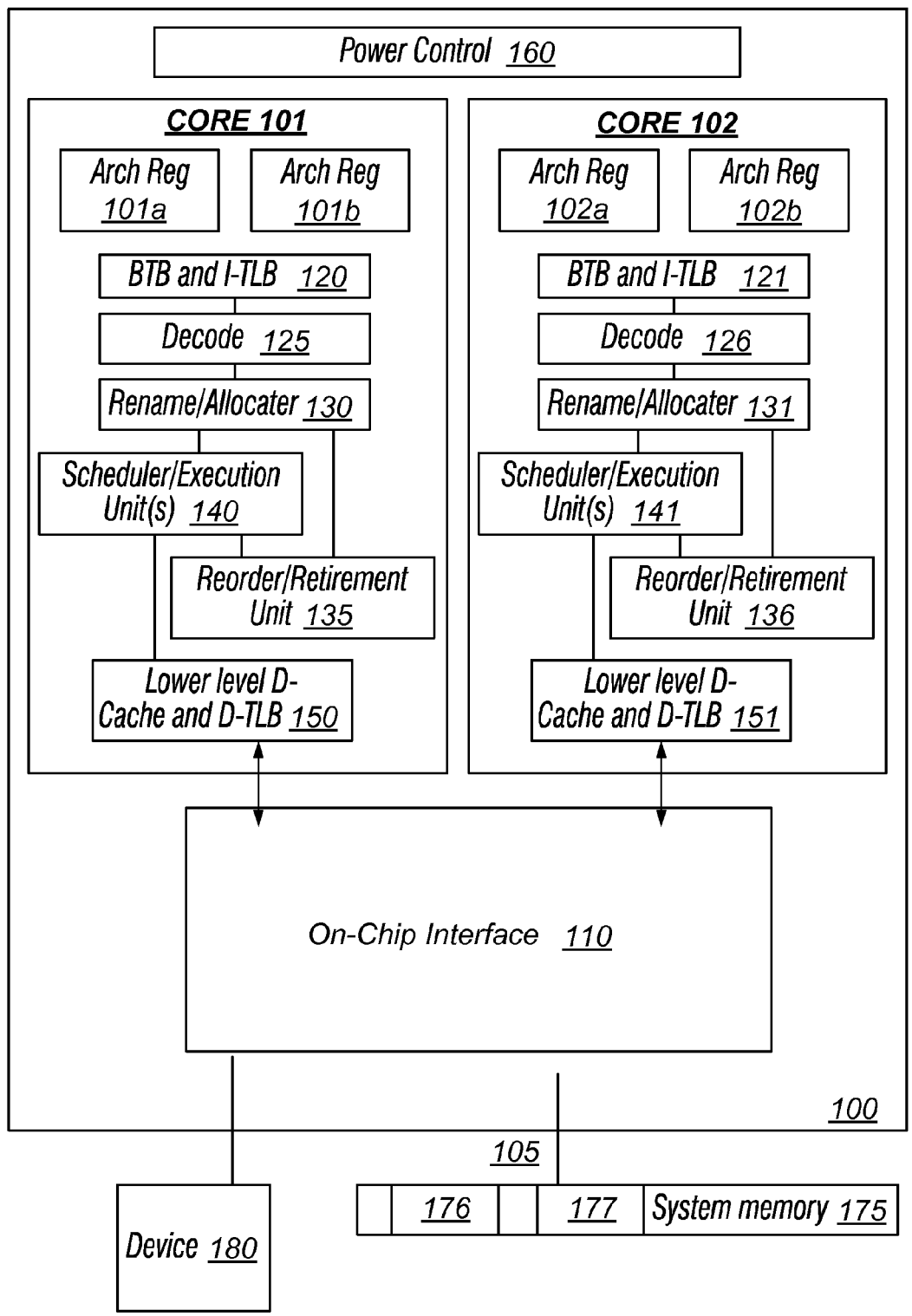
FIG. 1 is a diagram illustrating an embodiment of a block diagram for a computing system including a multicore processor.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etcetera in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to sever computer systems such as tower, rack, blade, or micro-server computer systems, desktop computer systems or Ultrabooks™, and may be also used in other devices, such as handheld devices, tablet computers (including 2:1 tablets), phablet computers, other thin notebooks, systems on a chip (SOC) devices, and embedded applications. Some examples of handheld devices include cellular phones, smartphones, Internet protocol devices, digital cameras, personal digital assistants (PDAs), and handheld PCs. Embedded applications may typically include a microcontroller, a digital signal processor (DSP), a system on a chip, network computers (NetPC), set-top boxes, network hubs, wide area network (WAN) switches, wearable devices, or any other system that may perform the functions and operations taught below. More so, embodiments may be implemented in mobile terminals having standard voice functionality such as mobile phones, smartphones and phablets, and/or in non-mobile terminals without a standard wireless voice function communication capability, such as many wearables, tablets, notebooks, desktops, micro-servers, servers and so forth. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the disclosure described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e., cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e., asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement units 135, 136, ILTB 120, load/store buffers, and queues may be shared through partitioning. Other resources, such as general purpose internal registers, page-table base register(s), low-level data-cache and data-TLB 115, execution unit(s) 140, 141, and portions of out-of-order unit 135, 136 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer blocks 130, 131 include an allocator to reserve resources, such as register files to store instruction processing results. However, threads 101a and 101b are potentially capable of out-of-order execution, where allocator and renamer blocks 130, 131 also reserve other resources, such as reorder buffers to track instruction results. Units 130, 131 may also include a register renamer to rename program/instruction reference registers to other registers internal to processor 100. Reorder/retirement units 135, 136 include components, such as the reorder buffers mentioned above, load buffers, and store buffers, to support out-of-order execution and later in-order retirement of instructions executed out-of-order.

Scheduler and execution unit(s) blocks 140, 141, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffers (D-TLB) 150, 151z are coupled to execution unit(s) 140, 141. The data cache is to store recently used/operated on elements, such as data operands, which are potentially held in memory coherency states. The DTLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e., a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 110 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g., cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for offchip communication. Yet, in the SOC environment, even more devices, such as the network interface, co-processors, memory 175, graphics processor 180, and any other known computer 10 devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e., generally where syntactic processing, semantic processing, and some transformation/optimization may take place, and (2) a back-end, i.e., generally where analysis, transformations, optimizations, and code generation takes place. Some compilers refer to a middle, which illustrates the blurring of delineation between a frontend and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etcetera in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality of Service (QoS), Hot-Plug/Hot-Swap support, Data Integrity, and Error Handling are among some of the advanced features supported by PCI Express.

Figure 2:
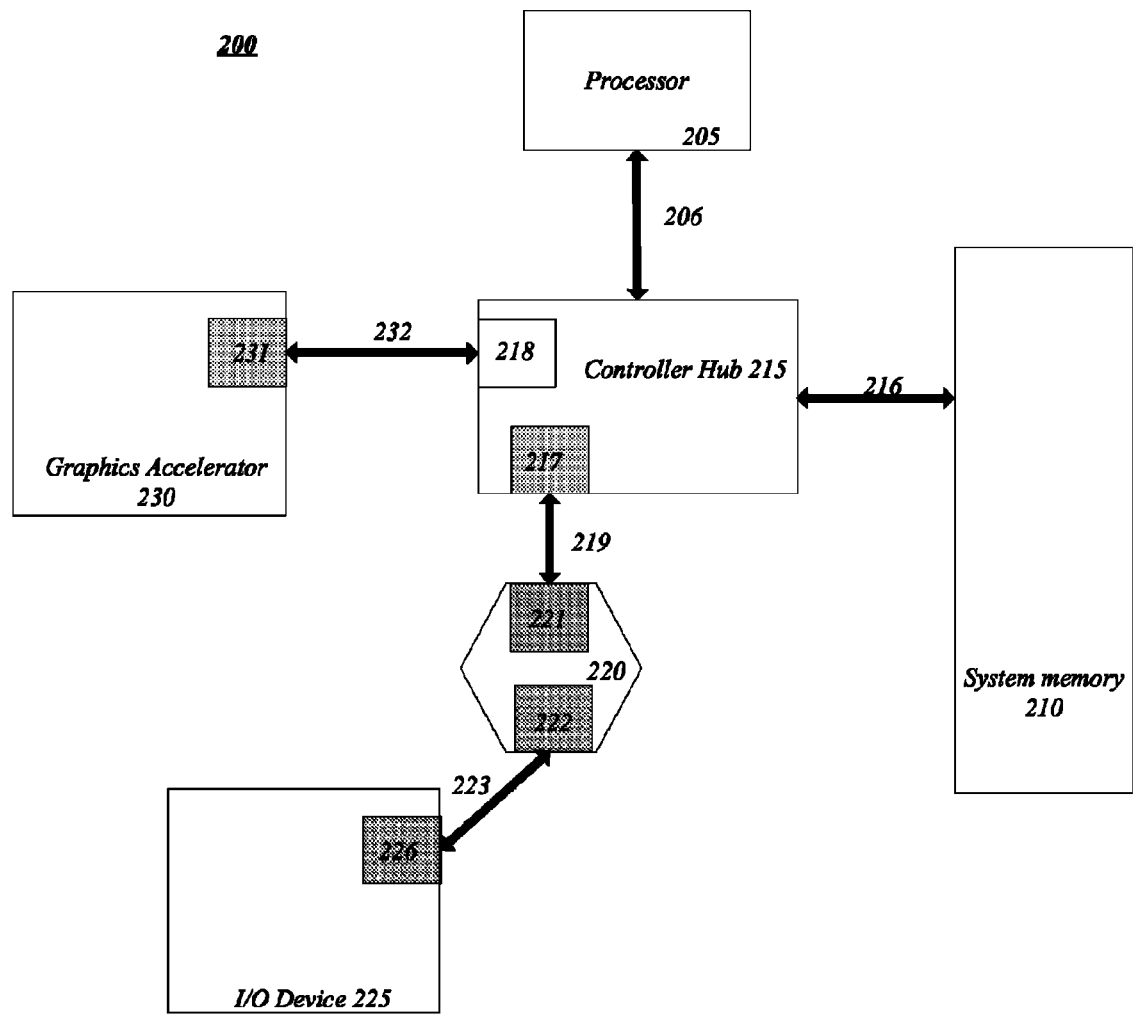
FIG. 2 is a schematic diagram illustrating an embodiment of a computing system including a peripheral component interconnect express (PCIe) compliant architecture.

Referring to FIG. 2, an embodiment of a fabric composed of point-to-point Links that interconnect a set of components is illustrated. System 200 includes processor 205 and system memory 210 coupled to controller hub 215. Processor 205 includes any processing element, such as a microprocessor, a host processor, an embedded processor, a co-processor, or other processor. Processor 205 is coupled to controller hub 215 through front-side bus (FSB) 206. In one embodiment, FSB 206 is a serial point-to-point interconnect as described below. In another embodiment, link 206 includes a serial, differential interconnect architecture that is compliant with different interconnect standard.

System memory 210 includes any memory device, such as random access memory (RAM), non-volatile (NV) memory, or other memory accessible by devices in system 200. System memory 210 is coupled to controller hub 215 through memory interface 216. Examples of a memory interface include a double-data rate (DDR) memory interface, a dualchannel DDR memory interface, and a dynamic RAM (DRAM) memory interface.

In one embodiment, controller hub 215 is a root hub, root complex, or root controller in a Peripheral Component Interconnect Express (PCIe or PCIE) interconnection hierarchy. Examples of controller hub 215 include a chipset, a memory controller hub (MCH), a northbridge, an interconnect controller hub (ICH), a southbridge, and a root controller/hub. Often the term chipset refers to two physically separate controller hubs, i.e., a memory controller hub (MCH) coupled to an interconnect controller hub (ICH). Note that current systems often include the MCH integrated with processor 205, while controller 215 is to communicate with I/O devices, in a similar manner as described below. In one embodiment, peer-to-peer routing is optionally supported through the root complex device.

Here, controller hub 215 is coupled to switch/bridge 220 through serial link 219. Input/output modules 217 and 221, which may also be referred to as interfaces/ports 217 and 221, include/implement a layered protocol stack to provide communication between controller hub 215 and switch 220. In one embodiment, multiple devices are capable of being coupled to switch 220.

Switch/bridge 220 routes packets/messages from device 225 upstream, i.e., up a hierarchy towards a root complex, to controller hub 215 and downstream, i.e., down a hierarchy away from a root controller, from processor 205 or system memory 210 to device 225 (i.e., interface ports 22, 226 through serial link 223). Switch 220, in one embodiment, is referred to as a logical assembly of multiple virtual PCI-to-PCI bridge devices. Device 225 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 225 may include a PCIe to PCI/PCI-X bridge to support legacy or other version PCI devices. Endpoint devices in PCIe are often classified as legacy, PCIe, or root complex integrated endpoints.

Graphics accelerator 230 is also coupled to controller hub 215 through serial link 232. In one embodiment, graphics accelerator 230 is coupled to an MCH, which is coupled to an ICH. Switch 220, and accordingly I/O device 225, is then coupled to the ICH. I/O modules 231 and 218 are also to implement a layered protocol stack to communicate between graphics accelerator 230 and controller hub 215. Similar to the MCH discussion above, a graphics controller or the graphics accelerator 230 itself may be integrated in processor 205.

Figure 3:
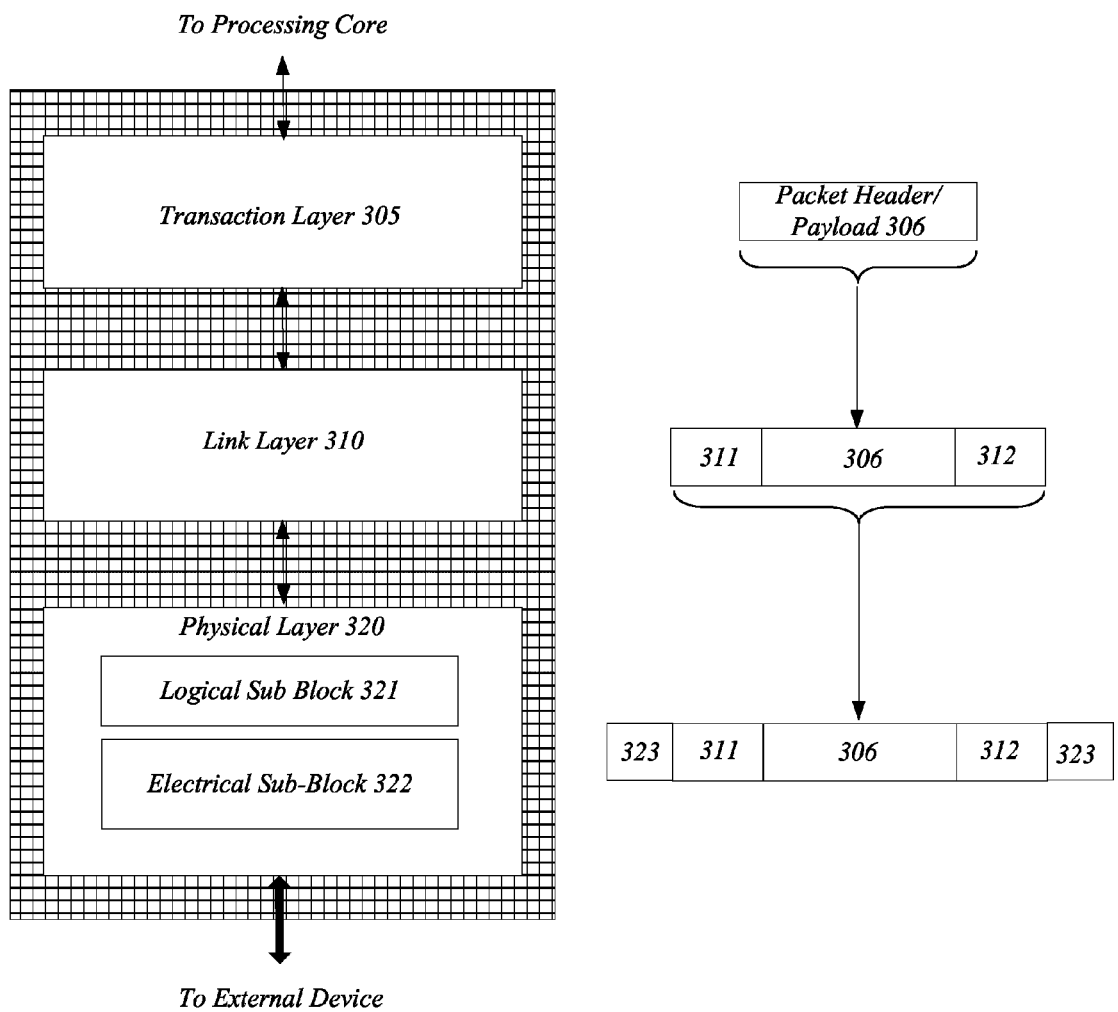
FIG. 3 is a schematic diagram illustrating an embodiment of a PCIe compliant interconnect architecture including a layered stack.

Turning to FIG. 3 an embodiment of a layered protocol stack is illustrated. Layered protocol stack 300 includes any form of a layered communication stack, such as a Quick Path Interconnect (QPI) stack, a PCIe stack, a next generation high performance computing interconnect stack, or other layered stack. Although the discussion immediately below in reference to FIGS. 2-5 are in relation to a PCIe stack, the same concepts may be applied to other interconnect stacks. In one embodiment, protocol stack 300 is a PCIe protocol stack including transaction layer 305, link layer 310, and physical layer 320. An interface, such as interfaces 217, 218, 221, 222, 226, and 231 in FIG. 2, may be represented as communication protocol stack 300. Representation as a communication protocol stack may also be referred to as a module or interface implementing/including a protocol stack.

PCI Express uses packets to communicate information between components. Packets are formed in the Transaction Layer 305 and Data Link Layer 310 to carry the information from the transmitting component to the receiving component. As the transmitted packets flow through the other layers, they are extended with additional information necessary to handle packets at those layers. At the receiving side the reverse process occurs and packets get transformed from their Physical Layer 320 representation to the Data Link Layer 310 representation and finally (for Transaction Layer Packets) to the form that may be processed by the Transaction Layer 305 of the receiving device.

In one embodiment, transaction layer 305 is to provide an interface between a device's processing core and the interconnect architecture, such as data link layer 310 and physical layer 320. In this regard, a primary responsibility of the transaction layer 305 is the assembly and disassembly of packets (i.e., transaction layer packets, or TLPs). The transaction layer 305 typically manages credit-base flow control for TLPs. PCIe implements split transactions, i.e., transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 305. An external device at the opposite end of the link, such as controller hub 115 in FIG. 1, which counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 305 assembles packet header/payload 306. Format for current packet headers/payloads may be found in the PCIe specification at the PCIe specification website.

Figure 4:
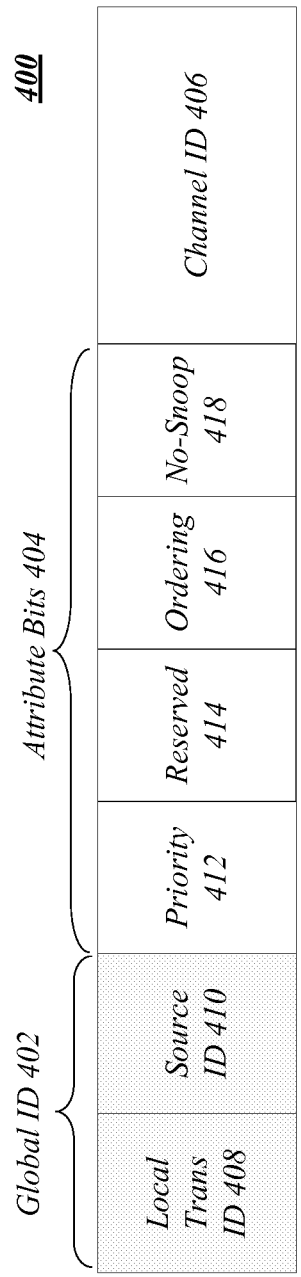
FIG. 4 is a schematic diagram illustrating an embodiment of a PCIe compliant request or packet to be generated or received within an interconnect architecture.

Quickly referring to FIG. 4, an embodiment of a PCIe transaction descriptor is illustrated. In one embodiment, transaction descriptor 400 is a mechanism for carrying transaction information. In this regard, transaction descriptor 400 supports identification of transactions in a system. Other potential uses include tracking modifications of default transaction ordering and association of transaction with channels.

Transaction descriptor 400 includes global identifier field 402, attributes field 404 and channel identifier field 406. In the illustrated example, global identifier field 402 is depicted comprising local transaction identifier field 408 and source identifier field 410. In one embodiment, global transaction identifier 402 is unique for all outstanding requests.

According to one implementation, local transaction identifier field 408 is a field generated by a requesting agent, and it is unique for all outstanding requests that require a completion for that requesting agent. Furthermore, in this example, source identifier 410 uniquely identifies the requestor agent within a PCIe hierarchy. Accordingly, together with source ID 410, local transaction identifier 408 field provides global identification of a transaction within a hierarchy domain.

Attributes field 404 specifies characteristics and relationships of the transaction. In this regard, attributes field 404 is potentially used to provide additional information that allows modification of the default handling of transactions. In one embodiment, attributes field 404 includes priority field 412, reserved field 414, ordering field 416, and no-snoop field 418. Here, priority sub-field 412 may be modified by an initiator to assign a priority to the transaction. Reserved attribute field 414 is left reserved for future, or vendor-defined usage. Possible usage models using priority or security attributes may be implemented using the reserved attribute field.

In this example, ordering attribute field 416 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes may pass writes in the same direction, and read completions may pass writes in the same direction. Snoop attribute field 418 is utilized to determine if transactions are snooped. As shown, channel ID Field 406 identifies a channel that a transaction is associated with. Link Layer (refer to FIG. 3)

Link layer 310, also referred to as data link layer 310, acts as an intermediate stage between transaction layer 305 and the physical layer 320. In one embodiment, a responsibility of the data link layer 310 is providing a reliable mechanism for exchanging Transaction Layer Packets (TLPs) between two components a link. One side of the Data Link Layer 310 accepts TLPs assembled by the Transaction Layer 305, applies packet sequence identifier 311, i.e., an identification number or packet number, calculates and applies an error detection code, i.e., CRC 312, and submits the modified TLPs to the Physical Layer 320 for transmission across a physical to an external device.

In one embodiment, physical layer 320 includes logical sub block 321 and electrical sub-block 322 to physically transmit a packet to an external device. Here, logical sub-block 321 is responsible for the "digital" functions of Physical Layer 321. In this regard, the logical sub-block includes a transmit section to prepare outgoing information for transmission by physical sub-block 322, and a receiver section to identify and prepare received information before passing it to the Link Layer 310.

Physical block 322 includes a transmitter and a receiver. The transmitter is supplied by logical sub-block 321 with symbols, which the transmitter serializes and transmits onto to an external device. The receiver is supplied with serialized symbols from an external device and transforms the received signals into a bit-stream. The bit-stream is de-serialized and supplied to logical sub-block 321. In one embodiment, an 8b/10b transmission code is employed, where ten-bit symbols are transmitted/received. Here, special symbols are used to frame a packet with frames 323. In addition, in one example, the receiver also provides a symbol clock recovered from the incoming serial stream.

As stated above, although transaction layer 305, link layer 310, and physical layer 320 are discussed in reference to a specific embodiment of a PCIe protocol stack, a layered protocol stack is not so limited. In fact, any layered protocol may be included/implemented. As an example, a port/interface that is represented as a layered protocol includes: (1) a first layer to assemble packets, i.e., a transaction layer; a second layer to sequence packets, i.e., a link layer; and a third layer to transmit the packets, i.e., a physical layer. As a specific example, a common standard interface (CSI) layered protocol is utilized.

As the frequency of serial links increase and chips migrate to new process technologies with ever decreasing device sizes, it becomes increasingly important to provide the capability to dynamically adjust the transmitter and receiver equalization settings to account for platform and silicon variations.

PCIe Generation 3 (PCIe Gen3) is an example of an industry standard that has equalization on a per transmitter-receiver pair basis to ensure interoperability at 8 GT/s for the wide range of systems that deploy PCIe. However, the wide variety of devices, manufactured by different vendors, with different process technologies, each with their proprietary transmitter/receiver design, and proprietary hardware algorithms to adapt makes it a challenge to design components with guaranteed interoperability.

Figure 5:
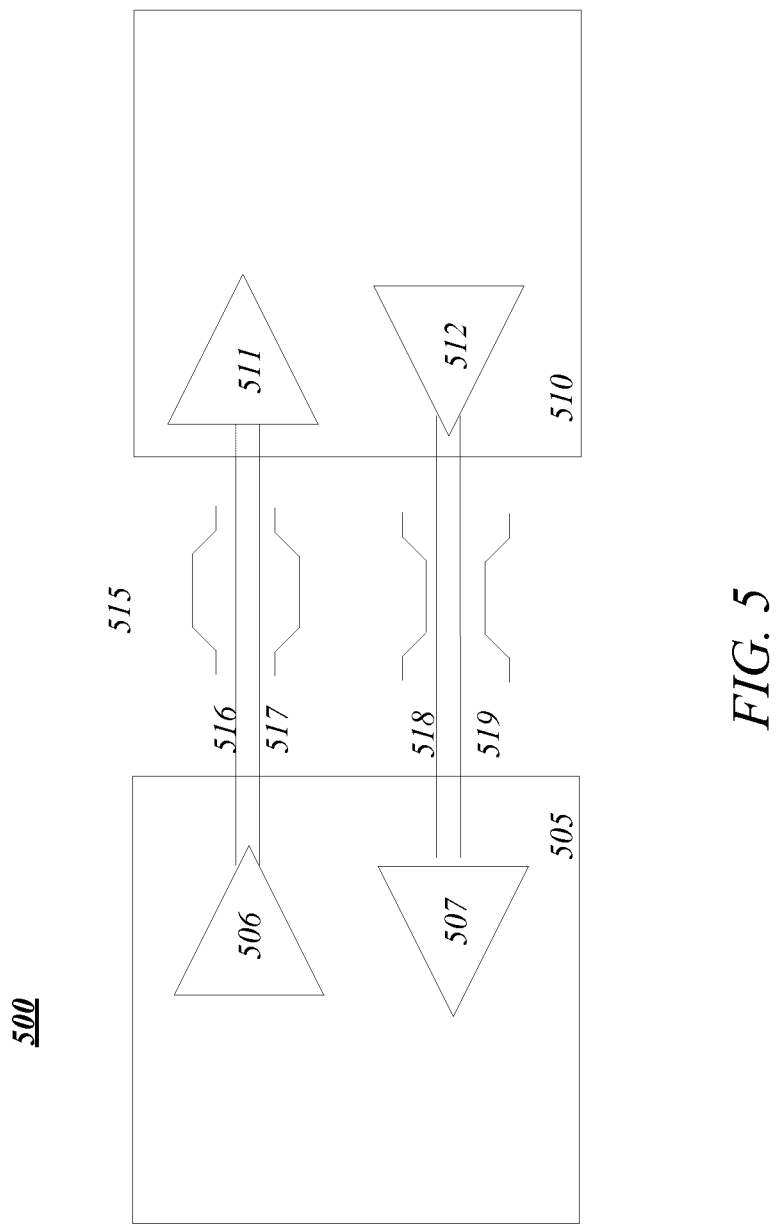
FIG. 5 is a schematic diagram illustrating an embodiment of a PCIe serial point to point fabric.

Referring next to FIG. 5, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 506/511 and a receive pair 512/507. Accordingly, device 505 includes transmission logic 506 to transmit data to device 510 and receiving logic 507 to receive data from device 510. In other words, two transmitting paths, i.e., paths 516 and 517, and two receiving paths, i.e., paths 518 and 519, are included in a PCIe link.

A transmission path refers to any path for transmitting data, such as a transmission line, a copper line, an optical line, a wireless communication channel, an infrared communication link, or other communication path. A connection between two devices, such as device 505 and device 510, is referred to as a link, such as link 515. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 516 and 517, to transmit differential signals. As an example, when line 516 toggles from a low voltage level to a high voltage level, i.e., a rising edge, line 517 drives from a high logic level to a low logic level, i.e., a falling edge. Differential signals potentially demonstrate better electrical characteristics, such as better signal integrity, i.e., cross-coupling, voltage overshoot/undershoot, ringing, etcetera. This allows for better timing window, which enables faster transmission frequencies.

In some systems, a memory model is used in which a single or unified memory is used by multiple components. For example, a modem or other communication processor of a system may use the same system memory that a central system processor uses, referred to herein as a unified memory (e.g., modem memory sharing). In this model, certain components may lack a direct attachment to this memory (which may be a DRAM). Performance of such components can be affected by latency to access the memory, which may be via one or more interposed components.

Embodiments may be used to optimize latency incurred, particularly within a system processor and endpoint requester (where the system processor is interposed between the memory to be accessed and the requester). In an embodiment, a system may be a PCI-based system such as a system including one or more PCIe components and/or mobile PCIe (or MEx) components. In such a system, a SoC is a root complex and a coupled processor such as a modem is an endpoint.

In one use case with a unified memory, an endpoint may seek to access the memory, e.g., due to a cache memory miss in the endpoint. In such case, a read request may be either a 32 Bytes or 64 Bytes (where 2 cache line misses can be combined) read request from the modem. The modem fabric and memory architecture supports and depends on the performance advantage obtained by early return of a critical portion of the cache miss reads. For example, one or more processing cores within the modem executes protocol stack code that may be highly branching in nature, and early critical information return can provide a performance boost.

In some communication protocols such as a PCI-based protocol, a transaction layer packet (TLP) includes a link cyclic redundancy checksum (LCRC) for the entire packet at the end of the packet. This means that when an endpoint has received a completion for a memory read request, it is to wait for all data to be returned from the root complex and then check the LCRC data before forwarding the packet to upper layers of the endpoint (e.g., to the modem fabric and cache memory in the above case).

An interconnect or link that couples root complex and endpoint may operate at various gears and widths for optimal power/performance. The latency to receive a complete packet depends on the operating link width and speed. In a conventional implementation, an undesirably large amount of clock cycles may occur before a complete packet is received and available to upper layers (after LCRC and other protocol stack processing). In one example, 32 bits of data may be received by the receiver at each clock cycle. Disregarding clock crossing and other serial PHY-related latencies, although a certain amount of data (which may include critical data) may be present within the receiver within a first number of clock cycles (e.g., 6), it can take more than double this number of clock cycles before being available to a consuming logic, due to LCRC and other protocol stack processing.

Accordingly, embodiments may allow a critical chunk of requested data (e.g., 4 Bytes (B) or 8 B as determined by the implementation) to be forwarded to upper layers of an endpoint (such as a core that is a consuming logic) as soon as it is available at the endpoint, which may reduce latency and enable faster forward progress of execution. This is particularly so in a component such as a modem that supports forwarding of a critical chunk (e.g., 8 B) from an I/O interface to a cache system as soon as it is available.

To realize such operation, a read request may indicate the request type is for a wrap request (e.g., 32 B or 64 B). In this request, a starting address in the TLP points to the critical chunk of interest and the data returned for these read requests wraps at an alignment boundary of the memory (e.g., 32 B aligned or 64 B aligned) instead of being incremental. In some cases, the starting address can be restricted to 4 B aligned or 8 B aligned.

In addition, a mechanism may be provided (e.g., in the DRAM itself or within the root complex) to reorder completion data from memory such that the critical chunk arrives first at the root complex. As an example, if a read request is for a request size of 32 B and has a starting address of 24, the returned data will have bytes from the starting address in the order 24, 25 . . . 31, 0, 1, 2 . . . 23. Similarly if the request starting address is 48 and request size is 64 B, returned data will have bytes from the address in the order 48, 49, 50 . . . 63, 0, 1, 2 . . . 47.

In addition, logic within a root complex (e.g., within a port) may be configured to return a first completion for the critical chunk first and followed by a second completion for remaining data. Continuing the examples above, the root complex will return two completions for the 32 B request. The first completion will contain the critical chunk data from address 24-31 and the second completion will contain bytes 0 to 23. Similarly for the 64 B request, the first completion will be data from addresses 48 . . . 55 and the second completion will have bytes from 56 . . . 63, 0 . . . 47. Of course, different groupings of the data may occur, and understand that a critical chunk can be set to any desired value, e.g., one or several bytes up to a large portion of a typical read request width.

In some embodiments to further reduce latency, a completion header size may be optimized, e.g., by reducing the header size to a single double word (32 bits) to improve small packet efficiency. Such optimization may be particularly applicable in mobile and small form factor systems in which a root complex is almost always connected directly to an endpoint, making certain fields of a completion header of a PCI-based protocol, such as a completer ID that identifies a requester and a requester ID that identifies a requester of the request, unneeded.

Referring now to Table 1, a critical chunk may be available to be forwarded to upper layers in a reduced number of clock cycles (e.g. in 5 cycles, where in each clock cycle 32 bits are received).

TABLE 1

| 1 | 2 | 3 | 4 | 5 | 6 | 7 | 8 | 9 | 10 | 11 | 12 | 13 | 14 | Clocks |
|---|---|---|---|---|---|---|---|---|----|----|----|----|----|--------|
| 32 | 32 | 32 | 32 | 32 | 32 | 32 | 32 | 32 | 32 | 32 | 32 | 32 | 32 | STP, Seq |
|   | 32 | 32 | 32 | 32 |   | 32 | 32 | 32 | 32 | 32 | 32 | 32 | 32 | Header |
|   |   | 32 | 32 | 32 |   |   | 32 | 32 | 32 | 32 | 32 | 32 | 32 |   |
|   |   |   | 32 | 32 |   |   |   | 32 | 32 | 32 | 32 | 32 | 32 |   |
|   |   |   |   | 32 |   |   |   |   | 32 | 32 | 32 | 32 | 32 |   |
|   |   |   |   |   |   |   |   |   |   | 32 | 32 | 32 | 32 | Data |
|   |   |   |   |   |   |   |   |   |   |   | 32 | 32 | 32 |   |
|   |   |   |   |   |   |   |   |   |   |   |    | 32 | 32 |   |
|   |   |   |   |   |   |   |   |   |   |   |    |    | 32 | LCRC |

As seen in Table 2, various latency reduction ranges may be realized depending on link width and/or speed. These savings can amount to approximately 15%-30% of the total latency of the root complex/endpoint M-PCIe latency.

TABLE 2

| Link Width/Speed | Latency Reduction for 32B Requests (ns) | Latency Reduction for 64B Requests (ns) |
|---|---|---|
| X1, G1 | 256 | 512 |
| X2 G1 | 128 | 256 |
| X1 G2 | 128 | 256 |
| X2 G2 | 64 | 128 |
| X1 G3 | 64 | 128 |
| X2 G3 | 32 | 64 |

In an embodiment for a PCIe/M-PCIe-based protocol, a vendor defined capability may be set forth in a capabilities structure, configuration register or other location to facilitate feature discovery and configuration. This capability information may identify that a port supports latency reduction, indicate support for wrap requests, critical data return and/or reduced completion headers (as controls may be provided to independently enable each of wrap requests, critical data return and reduced completion headers).

In some embodiments, a wrap read request may be implemented as a different type of memory read request (e.g., as a 32 B or 64 B wrap memory read (MRd)). Or a field may be provided in a header of a read request to indicate this transaction type. In an embodiment, a wrap read request header has the following properties:

a Request Type or TPH fields will indicate if the request is a wrap MRd
  transaction processing hints (TH) bit set,
  processing hint (PH)=00, Server usage models
  PH=01, Steering Tag used, Server usage models.
  PH=10, 32 B wrap
  PH=11, 64 B wrap.

In an embodiment, a wrap MRd can be of size 32 B or 64 B, and the address in the MRd points to the critical chunk (and which may be 8 B aligned). The data returned for the MRd may be the complete cache line pointed to by the address (but not a starting address+size like a conventional completion).

Split completion rules may be provided to return the critical chunk. When an integrated memory controller or other logic within a root port receives the completion from memory, the completion may be forwarded to the endpoint with completions for the same request returned in order. A critical chunk is returned only if control fields enable critical chunk completions to be separately returned.

The root complex thus splits the completion into multiple completions directed downstream to the endpoint, with the first completion containing only a first predetermined width (e.g., 8 bytes) received from memory and a following one or more completions containing the remaining data. In an embodiment in which a wrap MRd supports only 32 B or 64 B read requests, the second completion may be completed to known sets.

Figure 6:
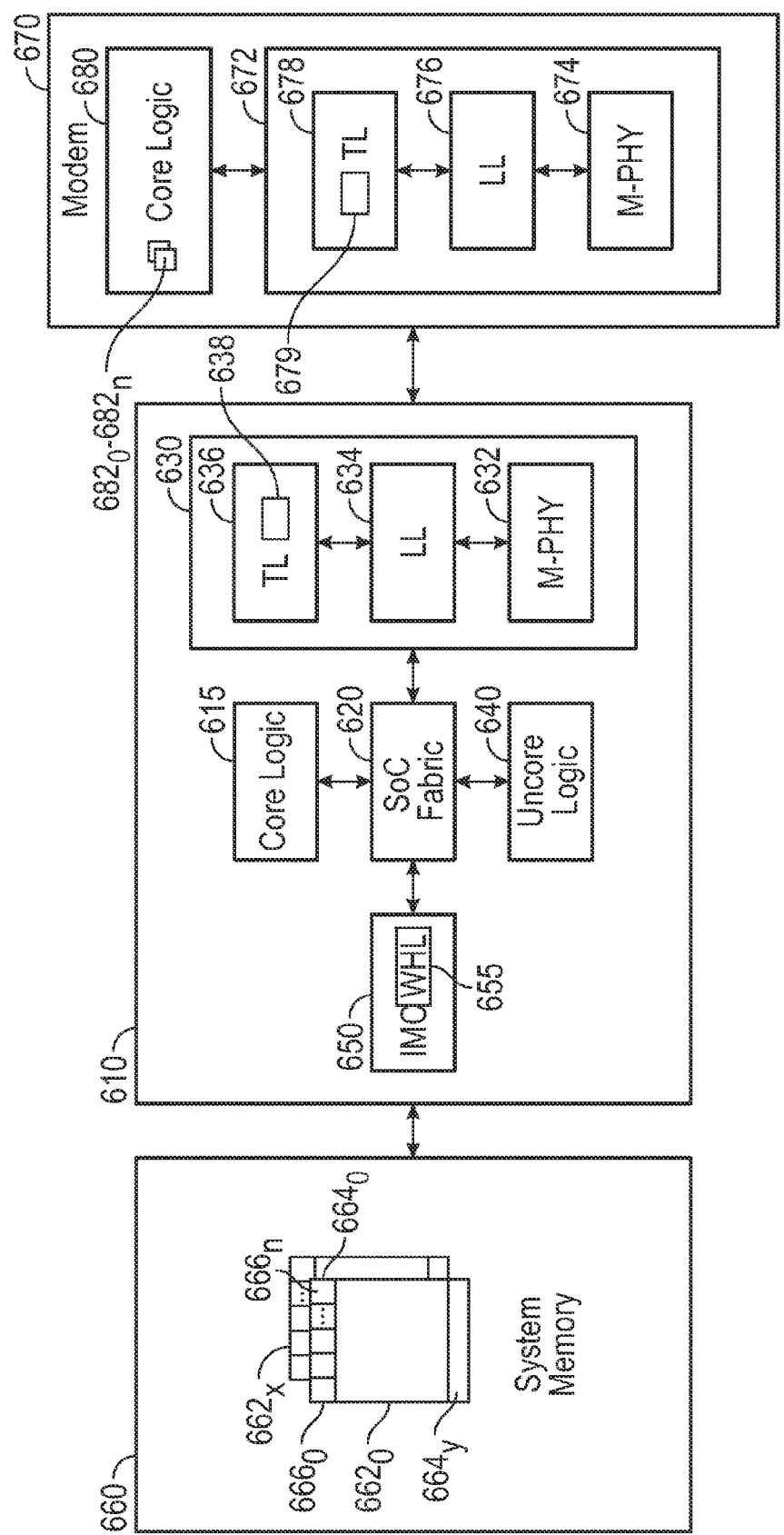
FIG. 6 is a block diagram of a portion of a system in accordance with an embodiment.

Referring now to FIG. 6, shown is a block diagram of a portion of a system in accordance with an embodiment. As shown in FIG. 6, the portion of system 600 shown includes a main processor 610 which in this embodiment is an SoC. However, understand that any type of central system processor such as an application processor of a mobile system may be present. In turn, SoC 610 couples to a system memory 660 (which in an embodiment may be DRAM), and a modem 670 which may be a communications processor that implements the protocol stack of one or more wireless communication protocols such as a 3G and/or 4G cellular communication protocol, a wireless local area network (WLAN) protocol such as a given IEEE 802.11 protocol or so forth.

Using an embodiment of the present invention, improved access to memory 660 by modem 670 may be realized using wrap memory requests as described herein. Understand that while shown with these limited number of components to illustrate embodiments, a given system may include many more components.

As seen in FIG. 6, SoC 610 includes a core logic 615 which may include multiple processor cores. In an embodiment, the cores may be a set of homogeneous processor cores such as a set of in-order cores or out-of-order cores. In another embodiment, the cores may include heterogeneous processor resources such as a mix of in-order and out-of-order cores. Core logic 615 couples to other components of SoC 610 via an SoC fabric 620 which may be a given type of on-die interconnect structure that has various resources, including one or more cache memories, routable interconnects, and routing and arbitration logic. As seen, SoC fabric 620 couples to other SoC components including an uncore logic 640 which may include a variety of logic of the SoC. In addition, SoC fabric 620 couples to an integrated memory controller (IMC) 650 that in turn controls access to system memory 660. IMC 650 includes a wrap handling logic 655 that is configured to handle incoming wrap memory requests and interface with memory 660 to receive data and generate multiple completions to a requester. In other embodiments, this logic and its handling may be performed as part of SoC fabric 620.

In addition, SoC fabric 620 couples to a protocol stack 630 formed of multiple layers, including a transaction layer 636, a link layer 634, and a physical layer 632. Transaction layer 636 includes logic 638 which may be configured to prepare separate completion packets for transmission to modem 670. In an embodiment, at least one of the layers of protocol stack 630 may be of a heterogeneous communication protocol. For example, in the embodiment of FIG. 6, physical layer 632 may be implemented as an M-PHY in accordance with and/or compatible with a given specification of Mobile Industry Processor Interface (MIPI) Alliance, while transaction layer 636 and link layer 634 may be in accordance with and/or compatible with a given PCI specification such as a PCIe specification. Understand also that various portions of SoC 610 may include hardware, software, firmware and/or other logic to perform memory wrap transactions as described herein.

Now with reference to modem 670, a corresponding protocol stack 672 is present including a transaction layer 678, a link layer 676, and a corresponding PHY layer 674. In turn, protocol stack 672 couples to a modem core logic 680 that may include multiple processor cores $682_0$-$682_n$. In an embodiment, relatively simple in-order low power cores may be used within modem 670. In a particular embodiment, cores 682 may be implemented as ARM processors. As further seen, core logic 680 also includes a cache memory 685 which may be one or more cache memories shared by the various cores. As seen, transaction layer 678 may include logic 679 configured to handle critical data within one or more completions and pass critical data on to core logic 680 before all packet processing is done on one or more related completions.

Now with reference to system memory 660, a plurality of memory pages 662 are present, namely pages $662_0$-$662_x$. Each page includes a plurality of cache lines $664_0$-$664_n$. In turn, each cache line includes a plurality of bytes $666_0$-$666_n$. In an embodiment, each cache line 664 includes 64 bytes, however understand the scope of the present invention is not limited in this regard. As described further below, various logic within modem 670 and SoC 610 may be present and configured to perform memory wrap transactions as described herein.

Figure 7A:
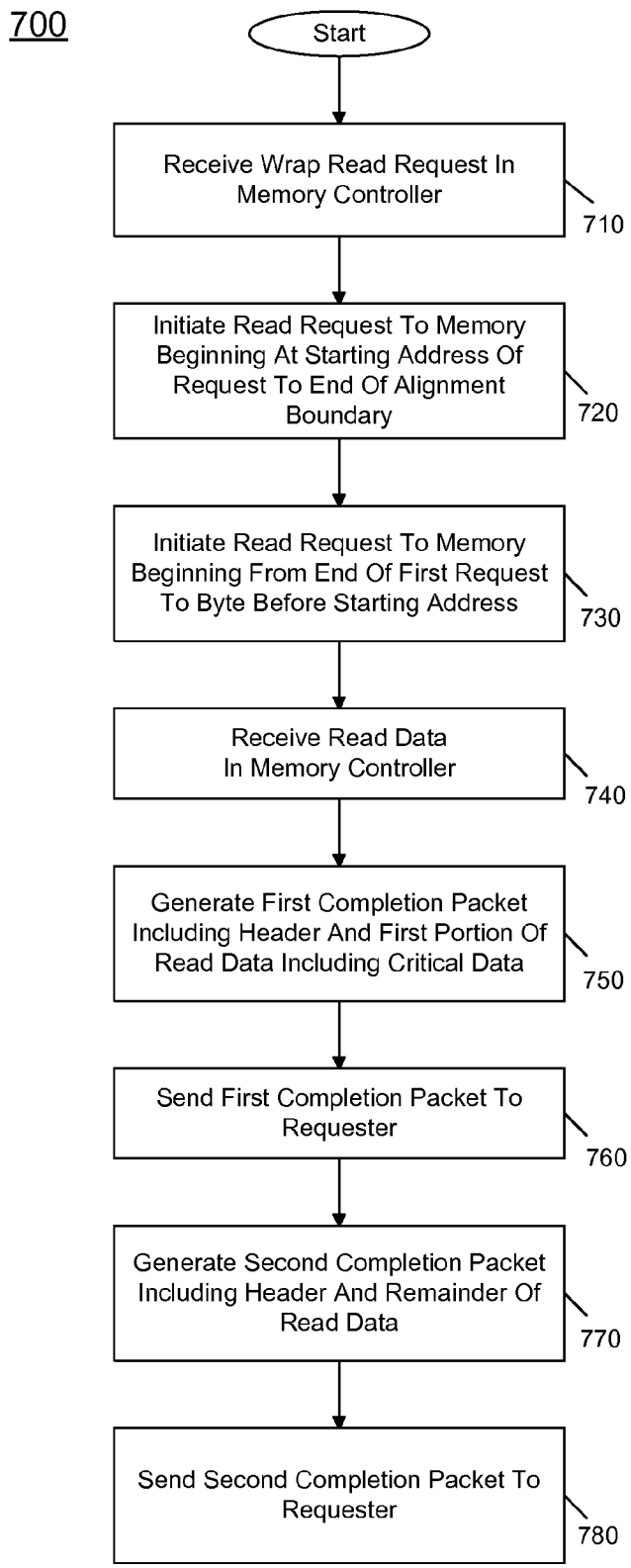
FIG. 7A is a flow diagram of a method for performing a memory wrap transaction as viewed from a completer, according to an embodiment.

Referring now to FIG. 7A, shown is a flow diagram of a method for performing a memory wrap transaction as viewed from a completer, according to an embodiment. More specifically, method 700 may be implemented in various logic within an SoC that couples between a modem and a system memory, e.g., a protocol stack, a SoC fabric and/or an IMC. Method 700 begins by receiving a wrap memory request in a memory controller (block 710). Such request may be received from a modem as requester and directed to a system memory that couples to an integrated memory controller of the SoC.

Responsive to this request, control passes to block 720 where a first read request may be initiated to the memory. More specifically, this read request may be initiated beginning at a starting address of the request and extending towards an end of an alignment boundary. Note that in some embodiments, this read request may be for a predetermined amount of data, e.g., 8 bytes. Given this minimal bit width, which is intended to include critical data, this read request may or may not reach an end of the alignment boundary (and if so, the request wraps to the start of the alignment boundary). In either case, control passes to block 730 where another read request may be initiated. More specifically, this read request may be initiated beginning at an address following the end of the first read request (and towards an alignment boundary and then wrapping if the end of the alignment boundary was not previously reached), and continuing to a byte before the starting address such that the memory read wraps from an end of an alignment boundary back to the alignment boundary beginning. Note that in certain embodiments, it is possible to generate more than two read requests to memory responsive to a single incoming read request. It is also possible for a single read request to be issued to the memory, with an encoding such that data is returned from the memory in an order reordered from a storage order in the memory.

Still referring to FIG. 7A, next read data is received in the memory controller (block 740). Using this data, a first completion packet may be generated (block 750). More specifically, this first completion packet that is generated includes a header and a first portion of the read data that includes the critical data. Note that this completion packet includes minimal CRC information (for this minimal first completion packet). As described above in an embodiment, this first completion may be for a limited amount of read data, e.g., 8 bytes. Next at block 760 this first completion packet is sent to the requester such that the requester has early access to the requested critical data. Note that the completion packet may be generated and sent to the requester before all requested data is received in the SoC, in some cases.

Still referring to FIG. 7A, next control passes to block 770, where a second completion packet is generated including a header and a remainder of the requested data. Thereafter at block 780, this second completion packet is sent to the requester. This second completion may include CRC information based on a checksum performed on data of the second completion packet. Although shown at this high level in the embodiment of FIG. 7A, understand the scope of the present invention is not limited in this regard.

Figure 7B:
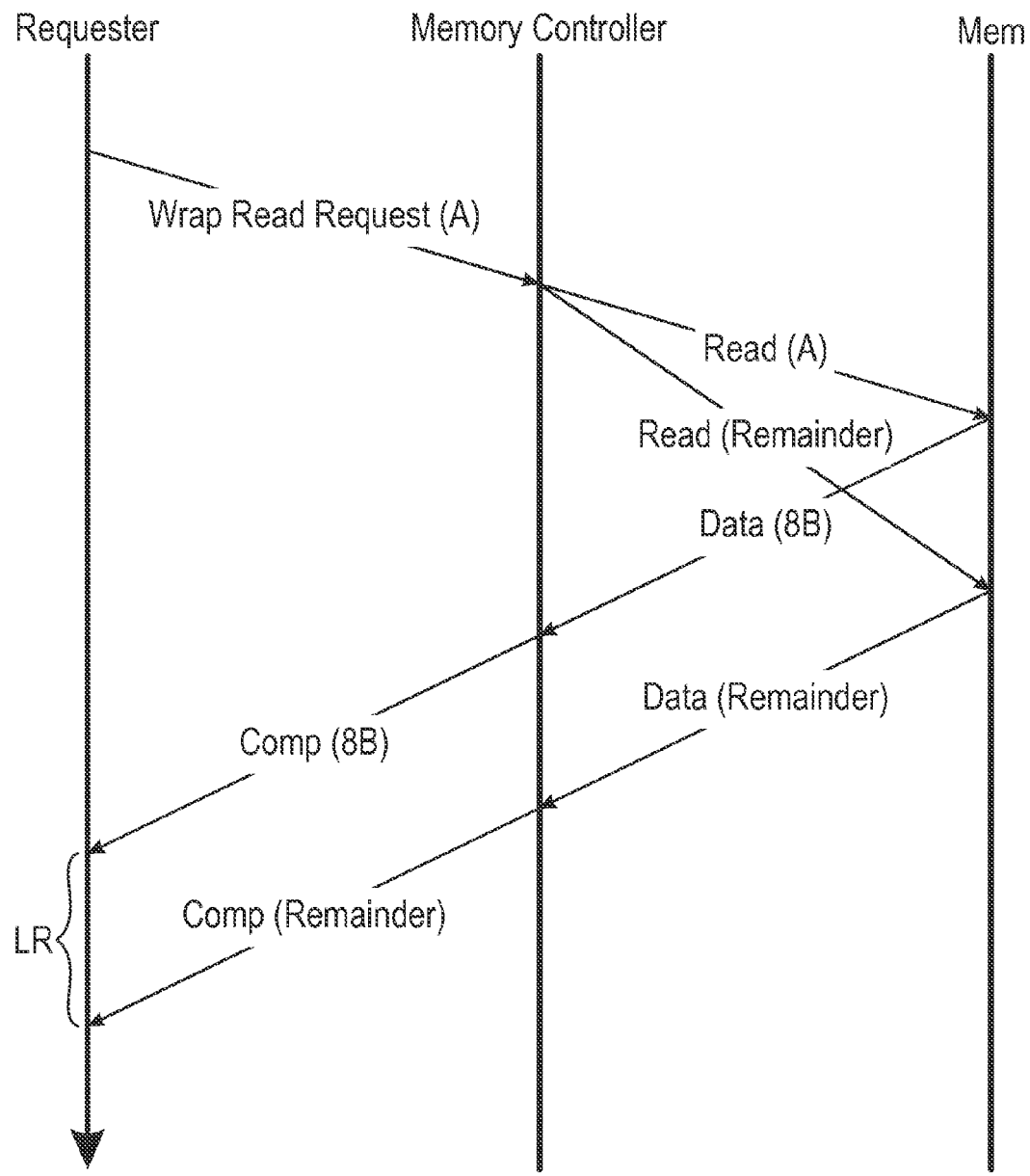
FIG. 7B is a protocol flow diagram of a method for performing a memory wrap transaction according to an embodiment

Referring now to FIG. 7B, shown is a protocol flow diagram for performing a memory wrap transaction. As with the above method 700, a requester communicates a wrap read request to a memory controller (e.g., of a processor) beginning at a desired starting address A (unaligned to a memory alignment boundary), which in turn generates multiple read requests to a memory (e.g., for 8 bytes beginning at A, and then for remainder data, with wrap). In turn, the memory controller generates multiple completions from the returned data and sends them back to the requester, such that a reduced latency (LR) is realized by the requester for receipt of critical data of the first completion (8 bytes in FIG. 7B).

Figure 8A:
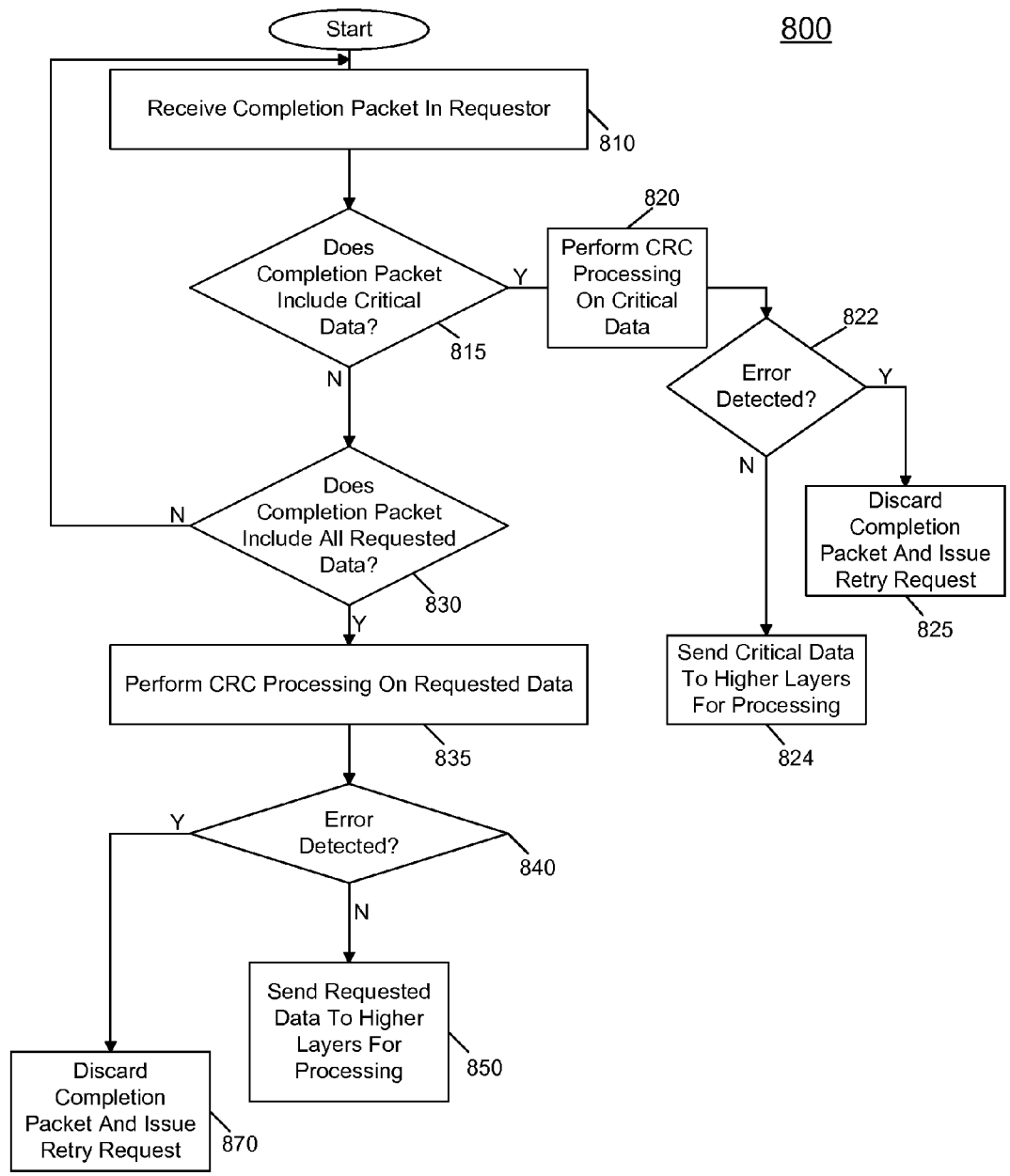
FIG. 8A is a flow diagram of a method for handling a wrap completion request as viewed from a requester, in accordance with an embodiment.

Referring now to FIG. 8A, shown is a flow diagram of a method for handling a wrap completion request as viewed from a requester, in accordance with an embodiment. More specifically, method 800 may be performed by various logic of a requester, including a protocol stack and/or a fabric. As shown in FIG. 8A, method 800 begins when a completion packet is received in a requester (block 810). Next, it can be determined whether this completion packet includes critical data (diamond 815). This determination may be made, e.g., based on a portion of the header of the completion packet that indicates that this is part of the first portion of a wrap memory read request response. If it is determined at diamond 815 that the completion packet includes critical data, control passes to block 820 where CRC processing may performed on the critical data. Note that as there is a limited amount of critical data, this CRC processing may be performed very efficiently. As such, and assuming no error is detected (at diamond 822), the critical data can be sent with minimal latency to higher layers for processing (block 824).

That is, instead of waiting for further completion packets to receive all requested data and perform additional receiving tasks on this additional data, such as performing error detection and/or correction, the verified critical data can be directly sent to higher layers, such as various core logic, e.g., executing a communication protocol stack. In this way the higher layers can begin one or more desired tasks. In fact this critical data can be sent to the higher layers before the rest of the requested data is received. If instead an error is detected, control passes to block 825, where the critical data packet may be discarded and a retry request may be issued to the completer.

Still referring to FIG. 8A, if the completion packet is not a critical data packet (as determined at diamond 815), control passes to diamond 830 to determine whether the completion packet includes all requested data. If not, such as in the case of a wrap memory request or other multi-completion situation, control passes back to block 810. When all requested data is received, control passes to block 835 where CRC processing can be done on the requested data and then it can be determined at diamond 840 whether an error is detected, e.g., based on the CRC processing. If no such error is detected, all or the remaining requested data can be sent to higher layers for processing (block 850).

If instead it is determined that an error is detected, control passes to diamond 870, where the completion packet may be discarded and a retry request may be issued to the completer to retry the request (block 870). Understand that while discussed with this particular implementation in the FIG. 8A embodiment, many variations are possible.

Figure 8B:
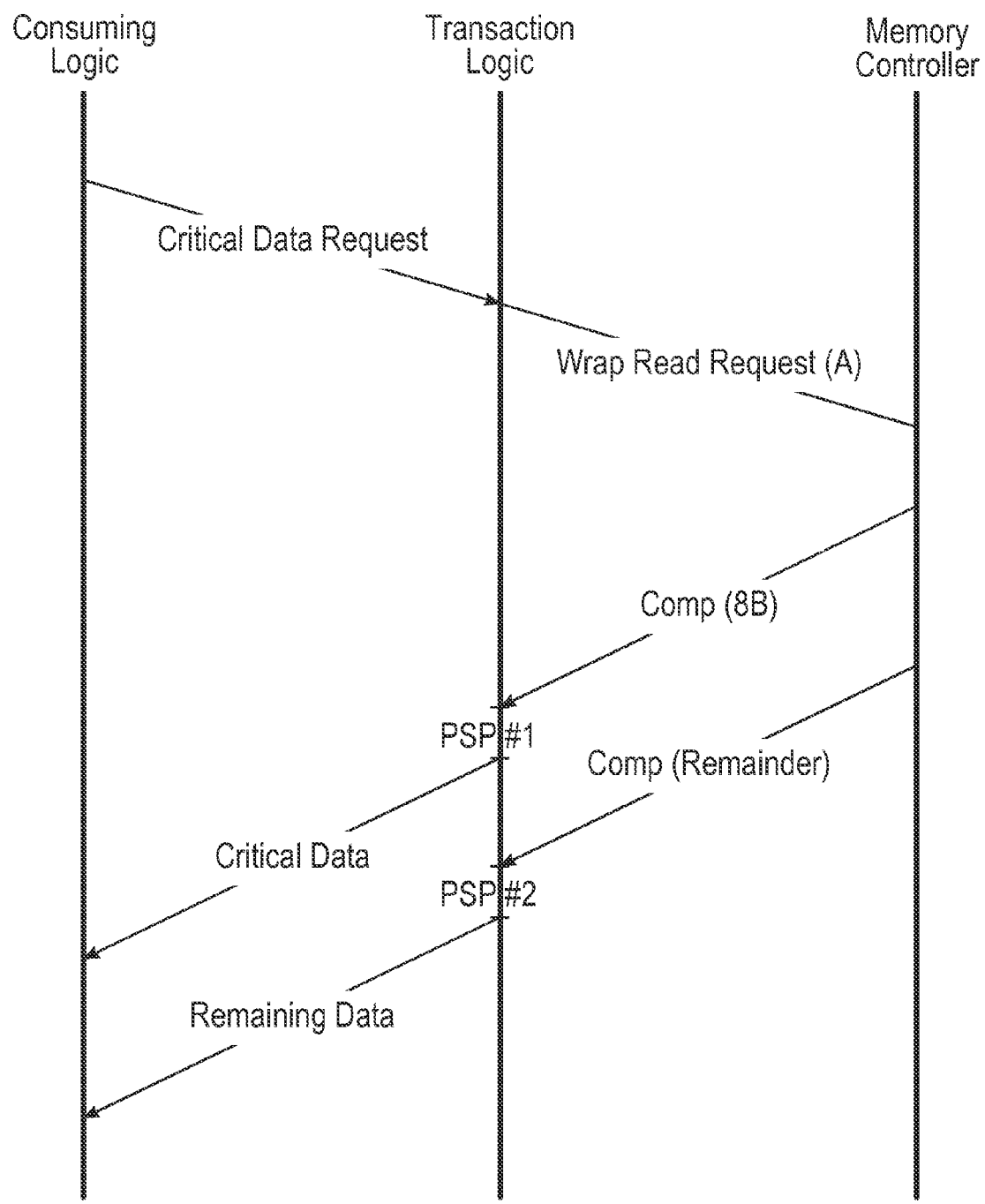
FIG. 8B is a protocol flow diagram of a method for handling a wrap completion request as viewed from a requester, in accordance with an embodiment

Referring now to FIG. 8B, shown is a protocol flow diagram for multiple completion handling. As seen, a transaction logic (e.g., of a transaction layer of a protocol stack) generates a wrap read request in response to receipt of a critical data request from consuming logic. In turn, multiple completions are received from a memory controller (or other completer), and protocol stack processing is performed independently on the 2 (or more) completions, such that the consuming logic receives the critical data with reduced latency.

In embodiments, reduced completions (meaning completions having a reduced header size) can be returned if a control field enables reduced completions to be returned. In one embodiment, reduced completions are used only for completions with data. All reduced completions are expected to be successful. Completions with status other than successful or completions without data may use a full completion header. Note that reduced completions may be used where an endpoint is directly connected to the root complex.

Figure 9:
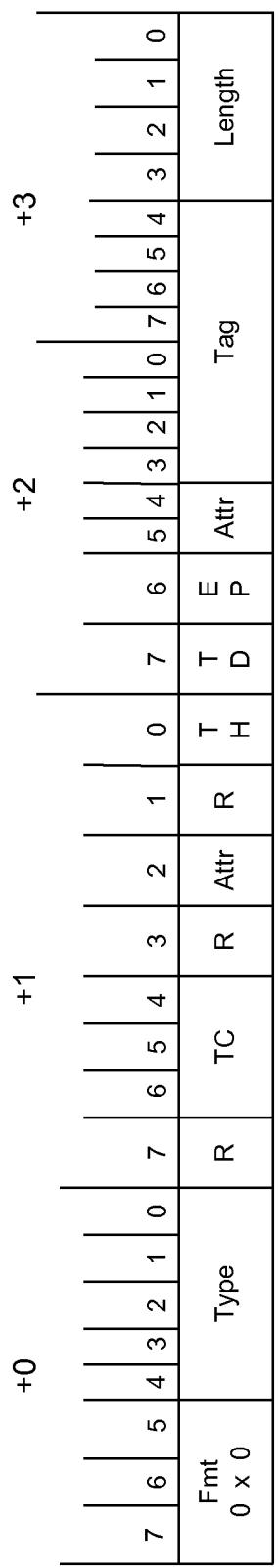
FIG. 9 is an illustration of a reduced completion header in accordance with one embodiment of the present invention.

Referring now to FIG. 9, shown is an illustration of a reduced completion header 900 in accordance with one embodiment of the present invention. In an embodiment, this reduced header format may generally include similar subject matter as the first double word of a conventional PCIe completion header. However, this header is only of a double word width, instead of a larger size of a conventional PCIe-compatible header which may be 3 double words. As seen in FIG. 9, header 900 includes a format (FMT) field set to a predetermined value (e.g., zero) to indicate that no prefixes are present. A type field may also have a predetermined value, given the lack of a prefix field. In turn, a traffic class (TC) field, multiple attribute fields, a TLP processing hint field, a TLP digest field, a poisoned TLP field are present. In addition, tag field to store a Tag may take the place of an address type (AT) field and further consume at least a portion of a length field (note that in a typical PCIe implementation, the length field may instead be 10 bits). Of course understand while illustrated with this particular implementation, a variety of header formats may indicate presence of a completion packet in another embodiment.

The following examples pertain to further embodiments.

In one example, an apparatus comprises: a receiver to receive a memory request, the memory request to request a block of data to begin at a particular address, the particular address to be unaligned to an alignment boundary of a memory line of a memory, the receiver to send at least a first read request to the memory to request the data block; a generator to receive the data block, generate a first completion packet to include a first portion of the data block, and generate a second completion packet to include a second portion of the data block; and a transmitter to send the first completion packet before the second completion packet.

In an example, the memory request comprises a wrap read request including the particular address. Responsive to the wrap read request, the receiver is to send the first read request to the memory to request the first portion of the data block beginning at the particular address, and send a second read request to the memory to request a remainder portion of the data block, including data following the first portion of the data block to a next alignment boundary and an initial portion of the data block extending from the alignment boundary to the particular address, in an example.

In an example, the apparatus is interposed between a requester and the memory, where the apparatus comprises a system on chip and the requester comprises a communications processor.

In an example, the memory is to reorder the data block before communication to the apparatus so that the first data block portion is to be sent to the apparatus before the second data block portion, the second data block portion including data stored beginning at the alignment boundary of the memory line. The first completion packet may include a header field including a length portion and a tag portion, and not including a completion identifier to identify a completer of the memory request or a requester identifier to identify a requester of the memory request, where the header field is less than a double word length.

In an example, the memory request is for a 64 byte data block and the first portion of the data block is 8 bytes. The first data block portion may include critical data to be returned to a requester ahead of a remaining portion of the data block.

In an example, the requester is to receive the first completion packet before the second completion packet, and to provide the first data block portion to a consuming logic of the requester after performing error detection on the first completion packet.

In an example, the requester is to perform the error detection on the first completion packet and the second completion packet independently, and issue a retry request to a completer if an error is detected.

Note that the above apparatus may be a processor that can be implemented using various means. In an example, the processor comprises a SoC incorporated in a user equipment touch-enabled device. In another example, a system comprises a display and a memory, and includes the processor of one or more of the above examples.

In another example, an apparatus comprises: a consumer to request and process data including but not limited to a critical data portion and a second data portion; and a protocol engine coupled to the consumer to issue a read request for the data, the read request to be routed, via a processor, to a memory to hold the data; and the protocol engine comprising a completion controller to receive a plurality of completions responsive to the read request and to send data of a first completion of the plurality of completions to the consumer before the completion controller finishes processing the plurality of completions.

In an example, the completion controller is to send the first completion data to the consumer before a second completion of the plurality of completions is received responsive to an indication of the critical data portion. The processing may include error detection processing on the plurality of completions. The critical data portion may include branch information for an application to be executed by the consumer. The read request may include a starting address of the memory at which a beginning of the critical data portion is stored, the starting address unaligned to an alignment boundary of the memory.

In an example, the protocol engine includes at least one PCIe-based logic and at least one MIPI-based logic.

In another example, a method comprises: receiving a first completion packet in a requester, responsive to a wrap memory request that requests a data block to be received reordered from a storage order of the data block in a memory; and sending a first data portion of the first completion packet to a consuming logic of the requester responsive to a determination that the first completion packet includes critical data, before all of the data block is received in the requester.

In an example, the method further comprises performing error detection processing on the first completion packet in the requester, discarding the first completion packet, and issuing a retry request to a completer if an error is detected, without sending the first data portion to the consuming logic.

In an example, the method further comprises independently performing protocol stack processing on the first completion packet and a second completion packet received responsive to the wrap memory request.

An apparatus comprising means may be configured to perform a method of any of the above examples. Also, a machine-readable storage medium may include machine-readable instructions, when executed, to implement a method of any of the above examples.

In another example, an apparatus comprises: a transaction layer to generate a memory read request transaction layer packet (TLP), where the memory read request TLP is to include a type field, the type field to include a first value to indicate the memory read request TLP is of a first length type and a second value to indicate the memory read request TLP is of a second length wrap type; a link layer to generate a link layer packet based on the memory read request TLP; and a physical layer transmit one or more messages based on the link layer packet.

In an example, the second length wrap type is to request a plurality of completions including a first completion having a critical data portion and a second completion having an additional data portion. The transaction layer may be configured to send the critical data portion a consuming logic before the second completion is received responsive to the second length wrap type. In an example, the transaction layer is to perform error detection processing independently on the first and second completions.

In another example, a root complex comprises: a receiver to receive a memory request from a requester to request a block of data to begin at a particular address to be unaligned to an alignment boundary of a memory line of a memory, the receiver to send at least a first read request to the memory to request the data block; a generator to receive the data block from the memory, generate a first completion packet to include a first portion of the data block beginning at the particular address, and generate a second completion packet to include a remainder portion of the data block; and a transmitter to send the first completion packet to the requester before the second completion packet.

In another example, a system comprises: a root complex including a core logic, a fabric, a first protocol stack and a memory controller, where the memory controller, responsive to a read request from an endpoint coupled to the root complex, is to issue a read request to a memory coupled to the root complex to receive a return of data in a different order than a storage order of the data in the memory, where the data includes a critical data portion and a second data portion; the endpoint coupled to the root complex, the endpoint comprising a consuming logic to request and process the data and a second protocol stack to send the read request to the root complex and to receive a plurality of completions responsive to the read request, the second protocol stack including a completion handling logic to send the critical data portion received within a first completion of the plurality of completions to the consuming logic before protocol stack processing is completed on the plurality of completions; and the memory coupled to the root complex.

In an example, the fabric is to generate the plurality of completions and to send the first completion to the endpoint before all of the data is received in the fabric. The fabric may generate the first completion with a first header without a completion identifier to identify a completer of the read request or a requester identifier to identify a requester of the read request, where the header field is less than a double word length.

In an example, the first protocol stack comprises at least one PCIe-based logic and at least one MIPI-based logic.

In another example, an apparatus comprises: a first logic to receive a memory request from a requester, the memory request to request a block of data beginning at a starting address of a memory, the starting address unaligned to an alignment boundary of a line of the memory, the first logic to send at least a first read request to the memory to request the data block; and a second logic to receive the data block, generate a first completion packet including a first portion of the data block, generate a second completion packet including a second portion of the data block, and send the first completion packet to the requester before the second completion packet.

In another example, an apparatus comprises: a consuming logic to request and process data including a critical data portion and a second data portion, the data stored in a memory to couple to a processor to be interposed between the apparatus and the memory; and a protocol stack logic coupled to the consuming logic to issue a read request to the memory via the processor to request the data and to receive a plurality of completions responsive to the read request, the protocol stack logic including a completion handling logic to send data of a first completion of the plurality of completions to the consuming logic before protocol stack processing is completed on the plurality of completions.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a receiver to receive a memory request, the memory request to request a block of data to begin at a particular address and comprising a wrap read request including the particular address, the particular address to be unaligned to an alignment boundary of a memory line of a memory, the receiver to send, responsive to the wrap read request, a first read request to the memory to request a first portion of the data block beginning at the particular address and a second read request to the memory to request a remainder portion of the data block, the remainder portion of the data block including data following the first portion of the data block to a next alignment boundary and an initial portion of the data block extending from the alignment boundary to the particular address;
a generator to receive the data block, generate a first completion packet to include the first portion of the data block, and generate a second completion packet to include the remainder portion of the data block; and
a transmitter to send the first completion packet before the second completion packet.

2. The apparatus of claim 1, wherein the apparatus is interposed between a requester and the memory, wherein the apparatus comprises a system on chip and the requester comprises a communications processor.

3. The apparatus of claim 1, wherein the memory is to reorder the data block before communication to the apparatus so that the first data block portion is to be sent to the apparatus before the remainder data block portion.

4. The apparatus of claim 1, wherein the first completion packet includes a header field including a length portion and a tag portion, and not including a completion identifier to identify a completer of the memory request or a requester identifier to identify a requester of the memory request, and wherein the header field is less than a double word length.

5. The apparatus of claim 1, wherein the memory request is for a 64 byte data block, and wherein the first portion of the data block is 8 bytes.

6. The apparatus of claim 5, wherein the first data block portion includes critical data to be returned to a requester ahead of the remainder portion of the data block.

7. The apparatus of claim 6, wherein the requester is to receive the first completion packet before the second completion packet, and to provide the first data block portion to a consuming logic of the requester after performing error detection on the first completion packet.

8. The apparatus of claim 7, wherein the requester is to perform the error detection on the first completion packet and the second completion packet independently, and issue a retry request to a completer if an error is detected.

9. An apparatus comprising:
a consumer to request and process data including but not limited to a critical data portion and a second data portion; and
a protocol engine coupled to the consumer to issue a read request, for the data including the critical data portion and the second data portion, the read request to be routed, via a processor, to a memory to hold the data; and
the protocol engine comprising a completion controller to receive a plurality of completions responsive to the read request and to send data of a first completion of the plurality of completions to the consumer before the completion controller finishes processing a remainder of the plurality of completions, and after the processing is finished, to send data of the remainder of the plurality of completions to the consumer;
wherein the read request includes a starting address of the memory at which a beginning of the critical data portion is stored, the starting address unaligned to an alignment boundary of the memory; and
wherein the remainder of the plurality of completions includes data following the data of the first completion to a next alignment boundary and an initial data of the plurality of completions extending from the alignment boundary to the starting address.

10. The apparatus of claim 9, wherein the completion controller is to send the first completion to the consumer before a second completion of the plurality of completions is received responsive to an indication of the critical data portion.

11. The apparatus of claim 9, wherein the processing includes error detection processing on the plurality of completions.

12. The apparatus of claim 9, wherein the critical data portion includes branch information for an application to be executed by the consumer.

13. The apparatus of claim 9, wherein the protocol engine includes at least one Peripheral Component Interconnect Express (PCIe)-based logic and at least one Mobile Industry Processor Interface (MIPI)-based logic.

14. At least one non-transitory computer readable medium including instructions that when executed cause a system to:
receive a first completion packet in a requester, responsive to a wrap memory request that requests a data block to be received reordered from a storage order of the data block in a memory; and
send a first data portion of the first completion packet to a consuming logic of the requester responsive to a determination that the first completion packet includes critical data, before processing a remainder of the data block is completed in the requester;
wherein the wrap memory request includes a starting address of the memory at which a beginning of the critical data is stored, the starting address unaligned to an alignment boundary of the memory; and wherein the remainder of the data block includes data following the first data portion to a next alignment boundary and an initial data portion extending from the alignment boundary to the starting address.

15. The at least one computer readable medium of claim 14, further comprising instructions that when executed enable the system to perform error detection processing on the first completion packet in the requester, discard the first completion packet, and issue a retry request to a completer if an error is detected, without sending the first data portion to the consuming logic.

16. The at least one computer readable medium of claim 14, further comprising instructions that when executed enable the system to independently perform protocol stack processing on the first completion packet and a second completion packet received responsive to the wrap memory request.

17. A system comprising:
a root complex including a core logic, a fabric, a first protocol stack and a memory controller, wherein the memory controller, responsive to a read request from an endpoint coupled to the root complex, is to issue a read request to a memory coupled to the root complex to receive a return of data in a different order than a storage order of the data in the memory, wherein the data includes a critical data portion and a second data portion;
the endpoint coupled to the root complex, the endpoint comprising a consuming logic to request and process the data and a second protocol stack to send the read request to the root complex and to receive a plurality of completions responsive to the read request, the second protocol stack including a completion handling logic to send the critical data portion received within a first completion of the plurality of completions to the consuming logic before protocol stack processing is completed on a remainder the plurality of completions; and
the memory coupled to the root complex;
wherein the read request includes a starting address of the memory at which a beginning of the critical data is stored, the starting address unaligned to an alignment boundary of the memory; and wherein the remainder of the plurality of completions includes data following the first completion to a next alignment boundary and an initial completion extends from the alignment boundary to the starting address.

18. The system of claim 17, wherein the fabric is to generate the plurality of completions and to send the first completion to the endpoint before all of the data is received in the fabric.

19. The system of claim 18, wherein the fabric is to generate the first completion with a first header without a completion identifier to identify a completer of the read request or a requester identifier to identify a requester of the read request, and wherein the header field is less than a double word length.

20. The system of claim 17, wherein the first protocol stack comprises at least one Peripheral Component Interconnect Express (PCIe)-based logic and at least one Mobile Industry Processor Interface (MIPI)-based logic.

* * * * *